R. Wood,

Chair Bottom,

No. 1,873, Reissued Feb. 14, 1865.

Witnesses.
Jno. B. Gale
C. S. Allen.

Inventor.
Robert Wood
Assignor
Henry S. Seymour

N. PETERS, PHOTO-LITHOGRAPHER, WASHINGTON, D. C.

UNITED STATES PATENT OFFICE.

HENRY I. SEYMOUR, OF TROY, NEW YORK, ASSIGNEE OF ROBERT WOOD.

IMPROVEMENT IN CHAIR-SEATS.

Specification forming part of Letters Patent No. 42,150, dated March 29, 1864; Reissue No. 1,873, dated February 14, 1865.

*To all whom it may concern:*

Be it known that I, ROBERT WOOD, of West Troy, in the county of Albany and State of New York, have invented new and useful Improved Chair-Seats, made by fastening narrow strips of veneers or thin wood across and to the seat-frames, as hereinafter described.

The drawings hereto attached are hereby made part hereof.

To enable others skilled in the art to use my invention I would say as follows:

My method of using my invention is to construct the seat-frame in any usual way and of any desired form, and to place narrow strips of veneer or thin wood at short intervals across such seat-frame, and the opposite ends of such veneers into channels or grooves cut therein for receiving the same, and thereto fasten them with glue or otherwise, thus forming an open seat somewhat like a cane-seat. These strips of veneers may be placed from front to back of the seat-frame, as shown in Figs. 3 and 5 of said drawings, or diagonally, as shown in Fig. 2, or in any desired direction, and the ends of the strips and channe's therefor may be shaped as shown on a large scale in Fig. 4, or otherwise, or such strips may be placed upon the frame and there secured.

Figure 1:
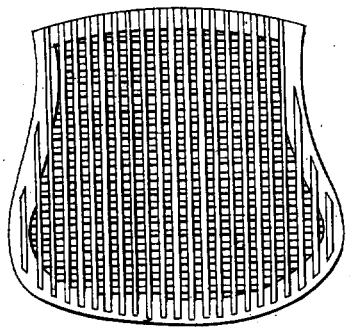
Figure 2:
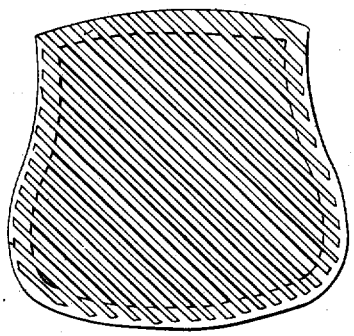
Figure 3:
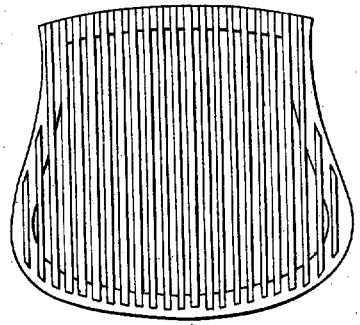
Figure 4:
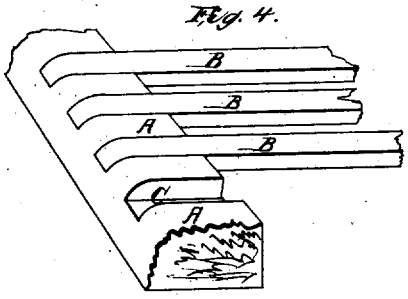
Figure 5:
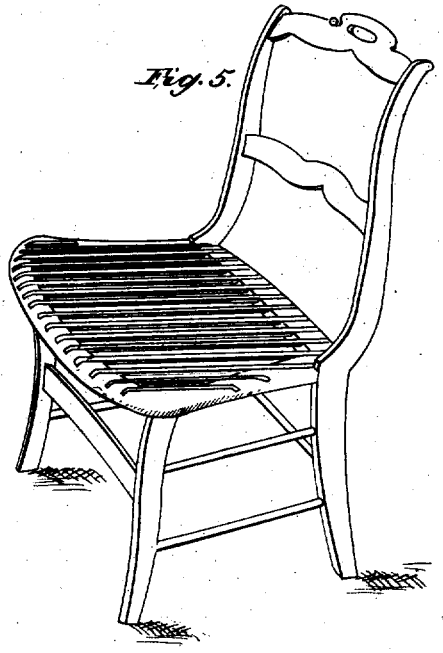

Instead of one set of strips, as shown in Figs. 2, 3, and 5, a second set may be added and placed underneath and at right angles to the first set, as shown in Fig. 1, or in any desired direction; or the sets may be interwoven more or less, and grooves for such second set may be cut either into the top or bottom side of the frame.

When only one set of strips is used, the same may be strengthened by one or two strips placed underneath or crosswise of the same, or diagonally, or otherwise, or wire may be used for this purpose.

The seats thus made may be used in chairs of any desired construction, and chair-backs may be made in the same manner.

What I claim as new, and desire to secure by Letters Patent, is—

Chair-seats and chair-backs made substantially as described, as a new article of manufacture.

ROBERT WOOD.
HENRY I. SEYMOUR,
*Assignee.*

Witnesses:
JNO. B. GALE,
C. L. ALDEN.